Sept. 19, 1967  R. LE BIHAN  3,342,643
FUEL CELL CONSTRUCTION
Filed Oct. 9, 1964  2 Sheets-Sheet 1

INVENTOR:
R. LE BIHAN

BY Paul Th. Craig, Jr.
ATTORNEY

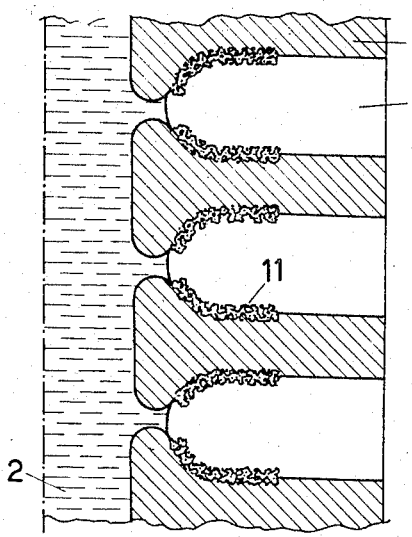
FIG:5
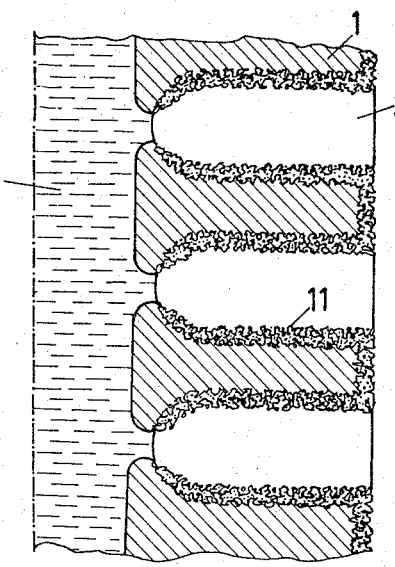
FIG:6
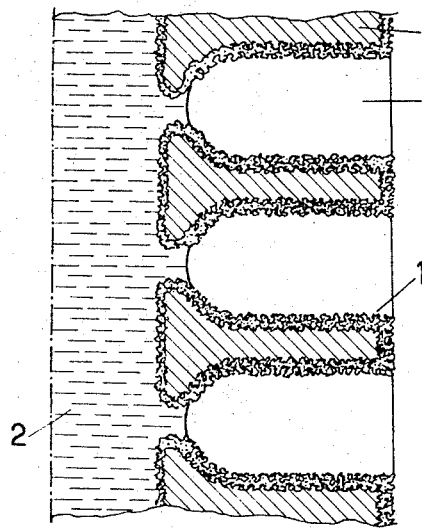
FIG:7
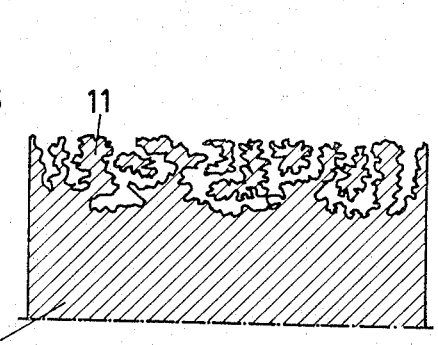
FIG:8

United States Patent Office 3,342,643
Patented Sept. 19, 1967

3,342,643
FUEL CELL CONSTRUCTION
Raymond Le Bihan, Paris, France, assignor to CSF—
Compagnie Generale de Telegraphie San Fil, Paris,
France
Filed Oct. 9, 1964, Ser. No. 402,823
Claims priority, application France, Oct. 18, 1963,
951,040; May 26, 1964, 975,845
5 Claims. (Cl. 136—120)

The present invention relates to fuel cells, and more particularly to those utilizing porous electrodes.

It is known that the cells of fuel cells, transforming chemical energy directly into electrical energy, comprise each a positive electrode and a negative electrode, disposed on both sides of an ion conductor such as, for example, an electrolyte in solution.

In the cells fed with gas, the electrodes may be either solid or porous, and among the latter one distinguishes:

(1) The electrodes with tortuous and disorderly arranged pores, and
(2) The electrodes with straight and regular pores.

The present invention relates to porous electrodes constituted by plates with straight and regular pores which assure, as is known, a better output to the cells than those with tortuous pores.

Since the straight and regular pores traverse the entire thickness of the plates, these pores will be referred to hereinafter as "transverse pores."

According to the present invention, the electrodes for fuel cells are plates with transverse pores, characterized in that supplementary pores which are non-transverse, are provided between the transverse pores or on the surface of the walls of the transverse ports.

The supplementary pores may be straight or tortuous, and may be provided over the entire thickness of the plates or only within the portion adjacent the electrolyte.

This novel arrangement increases the surface wetted by the electrolyte in each electrode and translates itself by a substantial improvement in the output of the cell.

Accordingly, it is an object of the present invention to provide a fuel cell having porous electrodes with straight regularly arranged pores which, by simple means, assures an improved output compared to the similar fuel cells of the prior art.

Another object of the present invention resides in the provision of a porous electrode structure for fuel cells which is provided with supplementary pores substantially increasing the output of the fuel cells.

These and other objects, features and advantages of the present invention will become more obvious from the following description when taken in connection with the accompanying drawing which shows, for purposes of illustration only, several embodiments in accordance with the present invention, and wherein FIGURE 1 is a partial cross sectional view through a known electrode for fuel cells of the type having straight pores.

FIGURES 3 to 7 are partial cross sectional views, similar to FIGURE 2, through other modified embodiments of porous electrode structures in accordance with the present invention, and FIGURE 8 is a partial cross sectional view, on an enlarged scale, illustrating the spongy layer of FIGURE 5.

Figure 1:
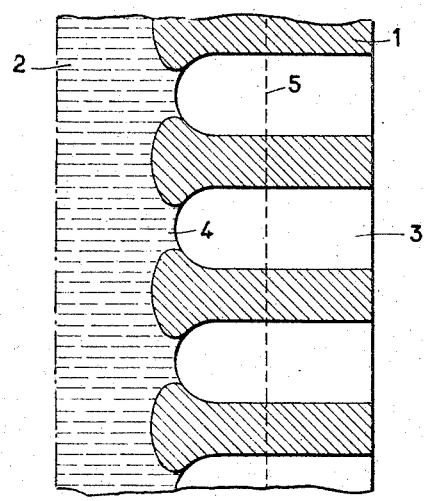

Referring now to the drawing wherein like reference numerals are used throughout the various views to designate like parts, and more particularly to FIGURE 1, reference numeral 1 designates therein a porous electrode of known type, in contact on one of its faces with a liquid electrolyte 2.

The electrode 1 comprises regular pores 3, constricted at the extremity 4 thereof adjacent the liquid 2.

Since the fuel cells are well known per se, the operation thereof will not be described herein in detail. Nevertheless, one will recall that in the fuel cells with liquid electrolyte and porous electrodes, fed with gas, one establishes a difference of pressure between the two faces of the electrodes in order that the electrolyte penetrates into the pores only over a slight fraction of the total thickness of the electrodes. Each porous electrode thus forms on the side of the electrolyte a thin layer comprising the portion of the pores submerged in the liquid, and on the opposite side a much thicker layer comprising the non-submerged portion of the pores, in contact with the gas.

The non-submerged layer, in contact with the gas, comprises a wetted portion and a dry portion, for in the direct neighborhood of the submerged portion, the liquid wets the adjacent surfaces by spreading over a certain extent.

Thus, in the electrode of FIGURE 1, the constricted portion 4 of the pores is completely submerged by the electrolyte 2, while a completely dry zone extends from the right face of the electrode toward the left up to a certain limit represented by the dash line 5, and an intermediate zone, wetter but not submerged, is comprised between the liquid 2 and the limit 5.

Experiments carried out in the laboratories of the assignee of the present application have demonstrated that the wetted but non-submerged portion in the pores of the electrodes play a very active role in the chemical reactions of the cells and that, for a given thickness of the electrode, the output of the cells increases with the surface of the active portions.

Putting this experimental discovery to good use, the present invention proposes to increase the output of fuel cells with porous electrodes by an increase of the active surface of the electrodes.

Figure 2:
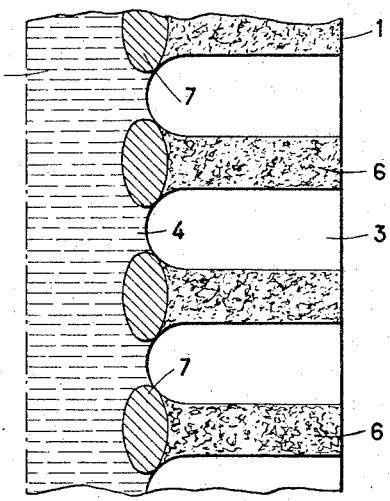
FIGURE 2 is a partial cross sectional view, similar to FIGURE 1 and illustrating the same porous electrode as in FIGURE 1, but modified in accordance with the present invention.

The electrode according to the present invention, illustrated in FIGURE 2, is provided with regular pores 3, exactly as that of FIGURE 1, but in addition thereto, it is provided with tortuous and irregular pores in the portions 6 which separate the large regular pores 3. The porosity 6 extends up to the surface of the liquid 2 while the portions 7 are preferably maintained solid.

Under these conditions the surface wetted by the liquid 2 of FIGURE 2 is much greater than in the case of FIGURE 1; for to the wetted surface in the straight pores 3 is added the wetted surface on the inside of the pores 6 in the neighborhood of the solid portions 7. The wetted surface in the portion 6 may also extend farther than the pores 3 of FIGURE 1, for very fine pores may give rise to the capillary effect which draws the liquid beyond the limits fixed by the existing depression, and new wetted areas are thus formed about the points attained by the liquid.

Figure 3:
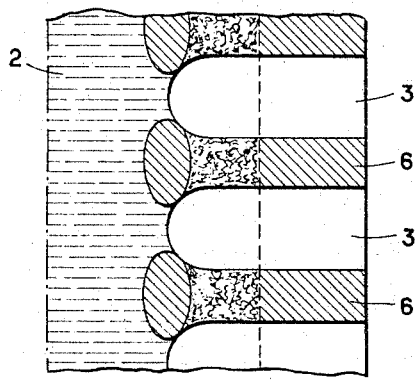

FIGURE 3 illustrates a modification of the present invention in which the portions 6 have tortuous pores only over the part thereof adjacent the liquid electrolyte 2. The interior of this porous part is thus wetted by the electrolyte, and the total active surface is increased in comparison with that of FIGURE 1.

Figure 4:
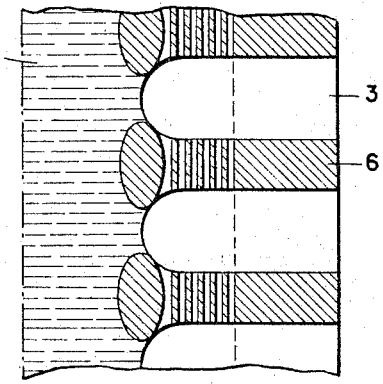

The tortuous pores of FIGURE 3 may be replaced by straight pores, as indicated in FIGURE 4, these two arrangements giving substantially equivalent results.

In the modification of FIGURES 5 to 8, the walls of the pores 3 are covered with a thin spongy layer 11 which constitutes a good catalyst and extends either over the wetted but non-submerged portion of the pores 3, that is, the portion adjacent the liquid 2 as indicated in FIGURE 5, or at the same time over the wetted and dry portions but not over the submerged portion, as indicated in FIGURE 6, or still over the entire extent of the walls of the pores 3, inclusive the portion submerged in the liquid 2 as shown in FIGURE 7.

The spongy layers 11 may be realized in the following manner:

If the electrodes 1 are made of nickel, one deposits on the portions which one desires to render spongy, a layer of aluminum, for example, by evaporation in vacuum, one heats the electrodes thus aluminized to obtain the penetration of the aluminum atoms between the nickel atoms, and one dissolves thereafter the aluminum, for example, by soda (NaOH). Spongy layers 11 thus form along the walls of the pores 3, covering the compact portion of the electrodes, as may be seen, on an enlarged scale in FIGURE 8.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A fuel cell electrode comprising a metal plate provided with regular, substantially straight, transverse pores, the walls of said transverse pores being at least partially covered with a spongy metal layer said layer containing minor, non-transverse pores of a mean diameter much smaller than that of said transverse pores, said electrode comprising a submerged portion for contact with an electrolyte and a non-submerged portion, said spongy layer of the transverse pores defining a channel of such a diameter as to form a liquid-gas interface across said channel at the submerged portion thereof, the non-transverse pores of the spongy layer of said non-submerged portion being at least partially wettable by the capillary action of said electrolyte on the submerged portion of the electrode.

2. The fuel cell electrode of claim 1, wherein the metal plate is made of nickel and the spongy layer is made of aluminum.

3. A fuel cell electrode comprising a metal plate provided with regular, substantially straight, transverse pores, the walls of said transverse pores being at least partially covered with a spongy metal layer said layer containing minor, non-transverse pores of a mean diameter much smaller than that of said transverse pores, said electrode comprising a submerged portion for contact with an electrolyte and a non-submerged portion, the transverse pores in the submerged portion of the electrode containing a restricted portion, said spongy layer of the transverse pores defining a channel of such a diameter as to form a liquid-gas interface across said channel at the submerged portion thereof, the non-transverse pores of the spongy layer of said non-submerged portion being at least partially wettable by the capillary action of said electrolyte on the submerged portion of the electrode.

4. The fuel cell electrode of claim 3, wherein the metal plate is made of nickel and the spongy layer is made of aluminum.

5. A fuel cell electrode comprising a nickel plate provided with regular, substantially straight, transverse pores, the walls of said transverse pores being at least partially covered with a spongy aluminum layer, said layer containing minor, non-transverse pores of a mean diameter much smaller than that of said transverse pores, said electrode comprising a submerged portion for contact with an electrolyte and a non-submerged portion, said spongy layer of the transverse pores defining a channel of such a diameter as to form a liquid-gas interface across said channel at the submerged portion thereof, the non-transverse pores of the spongy layer of said non-submerged portion being at least partially wettable by the capillary action of said electrolyte on the submerged portion of the electrode.

References Cited

UNITED STATES PATENTS

| | | | |
|---|---|---|---|
| 2,653,179 | 9/1953 | Baldwin | 136—24 |
| 2,860,175 | 11/1958 | Justi | 136—120 |
| 2,902,530 | 9/1959 | Eisen | 136—20 |
| 3,196,050 | 7/1965 | Thompson | 136—122 |
| 3,248,787 | 5/1966 | Plust et al. | 136—120 X |

FOREIGN PATENTS

| | | |
|---|---|---|
| 963,767 | 7/1964 | Great Britain. |

WINSTON A. DOUGLAS, *Primary Examiner.*

N. P. BULLOCH, *Assistant Examiner.*